United States Patent [19]

Tsuruishi

[11] 3,731,474
[45] May 8, 1973

[54] CHARGING CIRCUIT FOR WRIST WATCH HAVING SOLAR BATTERY

[75] Inventor: Yuki Tsuruishi, Suwa, Japan

[73] Assignee: Kabushiki Kaisha Suwa Seikosha, Tokyo, Japan

[22] Filed: Dec. 27, 1971

[21] Appl. No.: 212,297

[30] Foreign Application Priority Data

Dec. 29, 1970 Japan..............................45/128116
Feb. 18, 1971 Japan..................................46/7157

[52] U.S. Cl. ..............................58/23 C, 250/215 X
[51] Int. Cl. ..........................G04c 3/00, H01j 39/12
[58] Field of Search..................58/23 R, 23 A, 23 C, 58/5 DR; 250/215 X; 307/202

[56] References Cited

UNITED STATES PATENTS 3,293,568   12/1966   Ganter et al..........................58/23 A

FOREIGN PATENTS OR APPLICATIONS 898,366   6/1962   Great Britain........................58/23 C

*Primary Examiner*—Richard B. Wilkinson
*Assistant Examiner*—Edith C. Simmons Jackmon
*Attorney*—Alex Friedman et al.

[57] ABSTRACT

In a wristwatch having therein a solar battery and a secondary battery charged by said solar battery, a charging circuit prevents too high a current from flowing when the solar battery is strongly illuminated. Provision is also made for preventing overcharge of the secondary battery.

8 Claims, 7 Drawing Figures

CHARGING CIRCUIT FOR WRIST WATCH HAVING SOLAR BATTERY

BACKGROUND OF THE INVENTION

Where a solar battery is used for powering a table clock, the maximum light intensity which will fall on the solar battery can be anticipated, and, moreover, the maximum light intensity will be low enough so that, at most, only a resistor is necessary for controlling the flow of current from the solar battery to the secondary battery which is charges.

However, where the timepiece to be powered by a solar battery is a wristwatch, it is necessary to take into account the fact that the watch may be exposed directly to the sun, so that the charging current from the solar battery could become excessive, particularly with respect to the secondary battery which the solar battery charges. As is well known, particularly where the secondary battery is of the nickel cadmium type, charging at an excessively high rate can result in gassing to an extent such that the battery case may be ruptured. The rate of current flow through the secondary battery is a function of the voltage applied. To avoid excessively high currents through the secondary battery, therefore, it is necessary to control the voltages supplied by the solar battery.

As indicated above in connection with a timepiece in the form of a table clock, the voltage applied to the secondary battery can be controlled by means of a resistor in the circuit when the level of illumination to which the solar battery is exposed is relatively low. Such simple means, however, do not suffice where the solar battery can be exposed to direct sunlight, as is the case with a wristwatch which is worn out-of-doors. On the other hand, since the wristwatch, through a large part of the day, is worn in the interior of buildings, and may further be shaded by clothing, it is necessary that the solar battery be sensitive to relatively low levels of illumination. The situation which prevails, then, is that the charging circuit must be such as to interpose minimum resistance between the solar battery and the secondary battery when the level of illumination is low, and must control the maximum current applied to the secondary battery to a safe value, safety being judged by the avoidance of excessive gassing and the avoidance of excessive heating within the battery, which could also lead to a shorter life.

A further contingency which must be considered is that which prevails when the level of illumination is so low that the solar battery voltage is lower than that of the secondary battery. Under such circumstances, reverse flow through the solar battery must be prevented.

SUMMARY OF THE INVENTION

A solar battery and a secondary battery to be used for powering a timepiece are connected in a circuit in which the positive terminals of the two batteries are connected together and the negative terminals of the two batteries are connected together. The circuit includes a diode oriented to prevent reverse flow of current through the solar battery when the voltage of the secondary battery exceeds the voltage of the solar battery. Voltage drop across an element in the circuit is used to measure current flowing through the element. The voltage drop across the element is sensed by a transistor and is used to bypass part of the current flowing from the solar battery, so as to avoid excessive current through the secondary battery.

Means may also be provided for sensing the voltage across the solar battery and controlling the current flowing to the secondary battery, so as to avoid overcharge of the secondary battery.

Accordingly, an object of the present invention is to provide improved means for controlling the charging of a secondary battery by a solar battery in a timepiece.

Another object of the invention is to provide an improved means for preventing overcharge of a secondary battery by a solar battery in a timepiece.

A further object of the invention is to provide an improved means for sensing the voltage of a solar battery used for charging a secondary battery in a timepiece.

Still another object of the invention is to provide an improved means for bypassing a portion of the current generated by a solar battery when the total current is greater than can safely be supplied to a secondary battery being charged by said solar battery.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
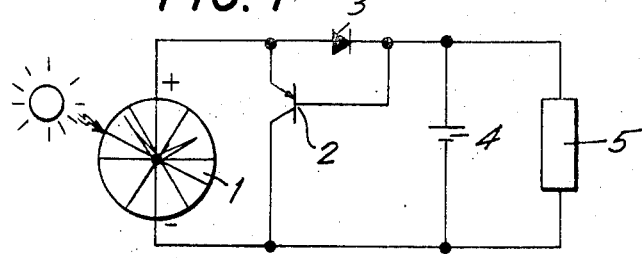
FIGS. 1, 2 and 3 are embodiments of the present invention in which improved circuits are provided for preventing charging of a secondary battery at an excessive rate.

In FIG. 1, the illuminated solar battery 1 charges secondary battery 4, the positive terminal of solar battery 1 being connected to the positive terminal of secondary battery 4 through diode 3, and the negative terminal of solar battery 1 being connected to the negative terminal of secondary battery 4. The purpose of diode 3 is to prevent reverse current flow when the level of illumination is low and the voltage of secondary battery 4 exceeds the voltage of solar battery 1. Transistor 2 provides a collector-emitter path in parallel with solar battery 1. The base of transistor 2 is connected to the cathode of diode 3 to sense the current flowing through diode 3. When the current becomes excessive, transistor 2 becomes conductive and a portion of the current flowing from solar battery 1 is bypassed through the collector-emitter path. In this way, secondary battery 4, which directly powers wrist watch 5, is protected from overcharge.

Preferably, transistor 2 is of the PNP type.

Figure 2:
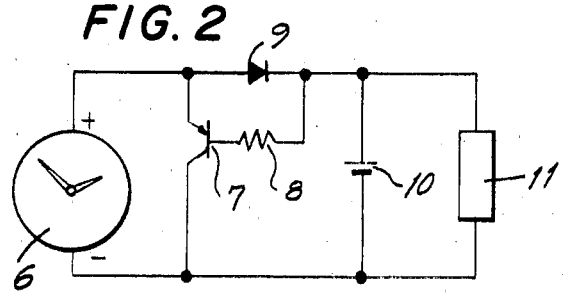
Figure 3:
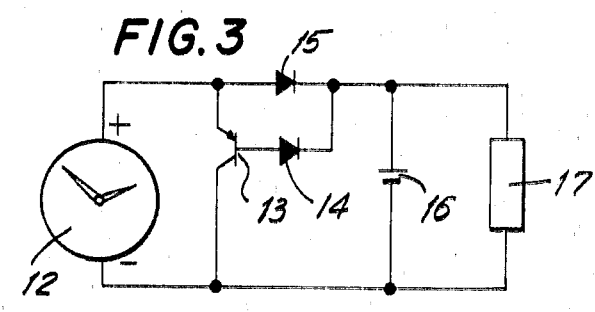

In FIGS. 2 and 3 timepieces 6 and 12 are assumed to have solar batteries mounted therein, and positive and negative terminals are appropriately marked on the diagrams.

In FIG. 2 the collector-emitter path of transistor 7 parallels solar battery 6 as in FIG. 1. However, the base of transistor 7 is connected to the cathode of diode 9 through resistor 8. In consequence, since part of the voltage drop between the cathode of diode 9 and the base of transistor 7 occurs in resistor 8, the current bypassed through transistor 7 is less than that bypassed through the transistor 2 of FIG. 1.

In FIG. 3 the circuit is the same as in FIG. 2 except for the fact that a diode 14 is substituted for resistor 8. Since the anode of diode 14 is connected to the base of transistor 13, transistor 13 does not become conductive through its collector-emitter path until the flow of current through and the voltage drop across diode 15 is substantially greater than for the analogous diodes in FIGS. 1 and 2.

Figure 4:
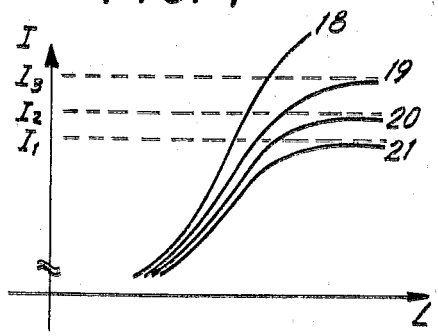
FIG. 4 is a graph showing the currents supplied as a function of the level of illumination for each of the circuits of FIGS. 1, 2 and 3, and when no control circuit is used.

In FIG. 4 the current flowing in the three circuits as a function of illumination is graphed. Line 18 of FIG. 4 shows the current that would be supplied to the secondary battery 4, 10, or 16 in the absence of a control circuit. As would be expected, the circuit of FIG. 1 limits the maximum current to $I_1$, which is approached by current line 21. Similarly, the maximum currents for the circuits of FIGS. 2 and 3 are given by the dashed lines $I_2$ and $I_3$, corresponding to current lines 20 and 19, respectively.

Figure 5:
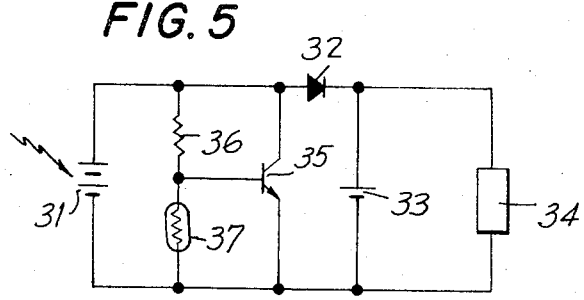
FIG. 5 is a further embodiment of the invention wherein the voltage applied to the secondary battery is controlled as a means of preventing overcharge of the secondary battery.

In the circuit diagramed in FIG. 5, high-value resistor 36 and thermistor 37 are in series, the combination being in parallel with solar battery 31. As battery 33 approaches the end of charge, the current drawn from solar battery 31 decreases, as a result of which the voltage of solar battery 31 increases. An increase in voltage across the resistor-thermistor combination increases the flow of current through the combination, heats up thermistor 37 and decreases its resistance. Resistor 36 and thermistor 37, serving as a voltage divider, are connected at the junction therebetween with the base of transistor 35. The voltage drop across resistor 36 increases, which in turn acts on transistor 35 to increase the conductivity of the emitter-collector path therethrough. As a consequence, if the voltage of solar battery 31 increases, either due to increase in illumination or because secondary battery 33 is approaching the end of charge, the combination of the voltage divider and transistor 35 acts to limit the current flowing between solar battery 31 and secondary battery 33.

Figure 6:
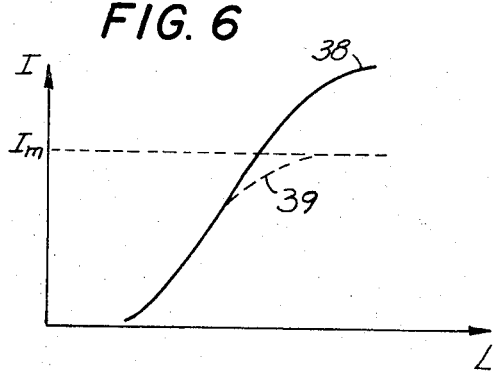
FIG. 6 shows the currents flowing through the secondary battery as a function of the level of illumination with and without the control circuit of FIG. 5.

FIG. 6 illustrates this situation graphically, where the current flowing as a function of the light intensity is shown. In the absence of the control circuit of FIG. 5, the current-light relationship is as shown by the line 38. Using the circuit of FIG. 5, the current follows along the solid line initially, and then as the light intensity increases, the current follows the dash line 39 to the maximum labelled $I_m$.

Figure 7:
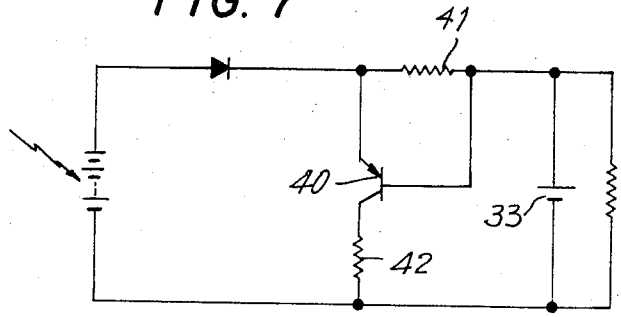
FIG. 7 is a further embodiment of the invention in which the current flowing in the charging circuit to the secondary battery is controlled to a safe limit.

It should be noted that the thermistor 37 also serves to compensate for variations in characteristics of transistor 35 with ambient temperature. In the embodiment of the invention shown in FIG. 7 transistor 40 serves the same function as before in bypassing part of the current flowing from the solar battery. Resistor 41 is placed in the circuit between the solar battery and secondary battery 43. As the current in the main circuit between the two batteries increases, the voltage drop across resistor 41 increases, increasing the conductivity through the collector-emitter path of transistor 40. However, resistor 42 is placed in series with the collector-emitter path of the transistor as a means of limiting the quantity of current bypassed. If the value of resistor 41 is set at about 100 ohms, the transistor 40 becomes conductive when the charging current reaches approximately 5mA, which effectively limits the charging current to this value. In the absence of resistor 42, the maximum value of the current flowing in the charging circuit is almost independent of the illumination level to which the solar battery is subjected. In the presence of the resistor 42, the bypass current is limited, so the cutoff effected by resistor 41 in the main charging circuit is not as sharp as would otherwise be the case.

It can be seen, therefore, that overcharge of a secondary battery by a solar battery can be prevented by providing a non-linear load in parallel with the solar battery and by designing the load in such a way that its impedence is reduced as the output current of the solar battery becomes excessive.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A timepiece powered by a solar battery comprising a secondary battery, first circuit means connecting the positive terminal of said solar battery with the positive terminal of said secondary battery and connecting the negative terminal of said solar battery with the negative terminal of said secondary battery for charging said secondary battery, a diode in said first circuit means for preventing reverse current flow through said solar battery when the voltage of said secondary battery exceeds the voltage of said solar battery, transistor means connected with the collector-emitter path thereof in parallel with said solar battery, and second circuit means connecting the base of said transistor means to said first circuit means for sensing the current flowing in a portion of said first circuit so that an increase in current flow through said solar battery causes an increase in current through said transistor means emitter-collector path, the increase in current through said transistor means emitter-collector path being such as to prevent excessively high current flow through said secondary battery and to prevent overcharge of said secondary battery.

2. A timepiece as defined in claim 1, wherein said transistor means is of the PNP type, with the emitter thereof connected to the anode of said diode and the base thereof connected to the cathode of said diode.

3. A timepiece as defined in claim 2, wherein said second circuit means includes a resistor.

4. A timepiece as defined in claim 2, wherein said second circuit means includes a diode having its anode connected to the base of said transistor.

5. A timepiece as defined in claim 1, wherein said first circuit means has therein said diode with its anode connected to the positive terminal of said solar battery and a first resistor connected at one end to the cathode of said diode and at the other end to the positive terminal of said secondary battery, said transistor means being of the PNP type, said transistor means emitter being connected to the junction of said first resistor and said diode and a second resistor connected between said transistor means collector and to the negative terminals of said batteries, said second circuit means for sensing the current in a portion of said first circuit means including a means connecting the base of said transistor means to the junction between said first resistor and said positive terminal of said secondary battery.

6. A timepiece powered by a solar battery comprising a secondary battery, first circuit means connecting the positive terminal of said solar battery with the positive terminal of said secondary battery and the negative terminal of said solar battery with the negative terminal of said secondary battery, a diode in said first circuit with its anode connected to the positive terminal of said solar battery, transistor means having its collector-emitter path extending from the anode of said diode to the negative terminals of said batteries, and second circuit means connecting the base of said transistor means and said first circuit means.

7. A timepiece as defined in claim 6, wherein said second circuit means comprises a resistor and a thermistor in series, the resistor being connected to the positive terminal of said solar battery, the thermistor being connected to the negative terminal of said solar battery, the base of said transistor being connected to the junction between said resistor and said thermistor.

8. A timepiece as defined in claim 6, wherein said transistor is of the PNP type.

* * * * *